United States Patent [19]
Sakaguchi et al.

[11] 3,810,200
[45] May 7, 1974

[54] PHOTOGRAPHIC CAMERA HAVING AN AUTOMATIC EXPOSURE ELEMENT SETTING DEVICE

[75] Inventors: Keiichi Sakaguchi; Noritsugu Hirata, both of Yokohama, Japan

[73] Assignee: Cannon Kabushiki Kaisha, Tokyo, Japan

[22] Filed: Nov. 16, 1972

[21] Appl. No.: 307,040

[52] U.S. Cl............... 95/31 FS, 95/10 C, 352/78 C, 352/72
[51] Int. Cl............................ G01j 1/04, G03b 17/26
[58] Field of Search............. 95/31 FS, 31 CA, 10 C, 95/64 D; 352/141, 72, 78 R, 78 C

[56] References Cited
UNITED STATES PATENTS
3,194,133 7/1965 Benson................................ 95/31 FS
3,667,363 6/1972 Tanaka................................ 95/31 CA

*Primary Examiner*—Robert P. Greiner
*Attorney, Agent, or Firm*—Toren, McGeady & Stanger

[57] ABSTRACT

A camera loadable with a notched magazine is provided with a loading chamber including a pair of opposed side walls. A plurality of mutually insulated, substantially parallel sensing electrodes are mounted on one of the side walls. The sensing electrodes are biased transversely toward the other side wall for contacting the notched surface of the magazine when the latter is loaded into the chamber, thereby completing a selected switching path to the exposure control circuit of the camera in accordance with the film sensitivity coded into the notch geometry. The cumulative transverse biasing force applied to the notched wall of the magazine by all of the sensing electrodes retains the camera in operating position against the opposite chamber wall at the same time that the sensing electrode selected by the notch geometry completes the required path to the exposure control circuit.

11 Claims, 19 Drawing Figures

PATENTED MAY 7 1974 3,810,200

PHOTOGRAPHIC CAMERA HAVING AN AUTOMATIC EXPOSURE ELEMENT SETTING DEVICE

The present invention relates to a photographic camera having an automatic exposure element setting device, especially to a photographing camera having a device to detect such signals as indicating exposure elements such as film sensitivity, etc. for automatically setting exposure element, wherein said device is provided on a magazine containing film.

Heretofore, such camera has been known that film sensitivity is retained in a coded manner within a magazine by a position of a notch formed at a sidewall of said magazine housing film, wherein an exposure control mechanism of a camera is automatically adjusted corresponding to the sensitivity of film of the magazine loaded when the magazine is loaded in a loading chamber of the camera.

For example a device disclosed in Japanese Pat. No. 43-19269 or in U.S. Pat. No. 3,260,182 is so made that an elastic contact detecting piece of a film sensitivity notch on a magazine engages with the notch when magazine is loaded into a loading chamber, then an exposure control element is adjusted corresponding to the film sensitivity by the contact detection piece being engaged. Further, the device disclosed in Japanese Pat. No. 43-22896 or U.S. Pat. No. 3,461,782 or the above mentioned U.S. Patent is so made that a sensitivity notch on a film magazine is scanned and detected in association with the opening and closing of a back lid at the time when the film magazine is loaded into the loading chamber of a camera for controlling an exposure control mechanical element.

The former method has such shortcoming that since the film magazine receives reaction force from an elastic contact detecting piece thus receiving force for transferring the same to outside of an operating position, the magazine is not fixed at its operating position at a time when the magazine is loaded, instead, the complete loading of the magazine and automatic setting of film sensitivity are done only after the back lid is closed while the magazine is being held down by hand, for instance, at a time when the magazine is loaded, thus the loading of a magazine is very difficult and the back lid must be closed by one hand while the magazine is being held down by the other hand, thus its handling is complicated.

On the other hand, the latter type has such shortcoming that an associating mechanism must be provided at a back lid mechanism for scanning and detecting the position of the notch on the magazine loaded, thus it is mechanically complicated and costs high.

The purpose of the present invention is to solve the above mentioned conventional shortcoming, and is characterized by that plural number of elastic branch shape pieces, one ends of which are fixed, while the other ends thereof are held as free ends, are fixed to a magazine loading chamber in such manner that portion of said pieces are pressed against a side wall of the film magazine loaded, and at the same time an opposite electrode is provided at a free end of each of branch shape pieces, so that an electric path for controlling and adjusting exposure is formed corresponding to the film sensitivity, through the branch shape piece by pressing of side wall of the magazine, further, the side wall of the magazine is pressed against the side wall of the magazine housing chamber of the camera by the elastic power of the branch shape piece, thus the magazine is semi-fixed.

BRIEF EXPLANATION OF DRAWINGS

FIG. 9 is a side view of an important part of a camera at a time when a film magazine with a different film sensitivity than that in FIG. 7 is inserted and a main switch is on.

Now explanations shall be made on concrete examples of the present invention referring to the drawings. FIG. 1 shows an example in which the present invention is applied to a cinecamera, wherein 1 is a main body of a camera, 2 is a photographing lens, 3 is an ocular window of a finder, 4 is a grip to hold the camera main body 1, and 5 is a magazine housing chamber within the camera main body 1. 6 shows a film magazine loaded in the housing chamber 5. The camera main body 1 in FIG. 1 is shown with a part of a side wall and a back lid omitted. 7 is a power source switch button held at a side wall frame of the camera main body 1 in a manner freely slidable to a direction of an arrow mark A, and $7_1$ is a movable contact provided integrally with the button 7. 8 is a guide member to slidingly guide the button 7, and 9 is an opposing contact fixed to the frame to open and close the main switch to be described later by its own on and off with the contact $7_1$. 10, 11, 12 are electrode plates overlappedly put together with insulating plates $10_1$, $11_1$ being sandwiched therebetween (FIG. 2(A) ) and are made of spring material, and each one of them is overlappedly positioned and one ends thereof are fixed by a fixing plate 13 of insulating nature, while the other ends are made free and are protruding into the magazine housing chamber 5.

14, 15, 16 are opposing electrode plates being overlappedly put together with insulating plates $10_1$, $11_1$ being sandwiched therebetween, and an end of each one of said electrode plates is fixed by a fixing plate 13. The other end of the same is bent in L-shape and is facing against branch shape free ends $10_2$, $11_2$, $12_2$ of the electrode plates 10, 11, 12 being formed in ⊐-shape. Each of free ends $10_2$, $11_2$, $12_2$ is bent towards the direction of interior of the camera housing chamber 5 by its elasticity in a state wherein the magazine 6 is not loaded in the housing chamber 5, thus being separated from the opposing electrodes 14, 15, 16. The electrode plates 10, 11, 12 are connected together with lead wire at their fixed ends (FIG. 2(A) and FIG. 5). On the other hand, the opposing electrodes 14, 15, 16 are connected to correction resistance $R_1$, $R_2$, $R_3$, respectively within the exposure control circuit of FIG. 3. The resistances $R_1$, $R_2$, $R_3$ are connected in parallel with a photo-conductive cell CdS and a galvanometer G circuit, wherein a pointer of the meter is fixed to an iris plate of a camera, through a switch being composed by the above mentioned electrode plates and the opposing electrodes, and a portion of the current flowing through the galvanometer G is put together so that such amount of current as corresponding to the sensitivity of film used is diverted to effect correction of the amount of exposure. In FIG. 3 M is a motor for feeding film, E is a power source, and $S_o$ shows a main switch.

In FIG. 1, 17 is a supporting axle of the axis of the grip 4, and 18 is a cam piece integrally formed with the grip. 19 is a magazine holding piece axially supported by an axial supporting axle 20 on the frame in a freely rotatable manner, and the holding piece 19 is always biassed with rotating elastic power to counter clockwise direction by the elastic power of a spring 21. When the grip 4 is placed down to a direction of B in FIG. 4 and is shifted to non-use position, the holding piece 19 rotates to counter clockwise direction by the force of the spring 21 as the cam piece 18 slides, and the holding piece 19 is shifted to outside of the film housing chamber.

When a film magazine 6 is loaded in a camera main body in the above mentioned arrangement, as the grip 4 is in the nonuse position the holding piece 19 is shifted to outside of the housing chamber, therefore the magazine is freely pushed into the loading position.

Figure 3:
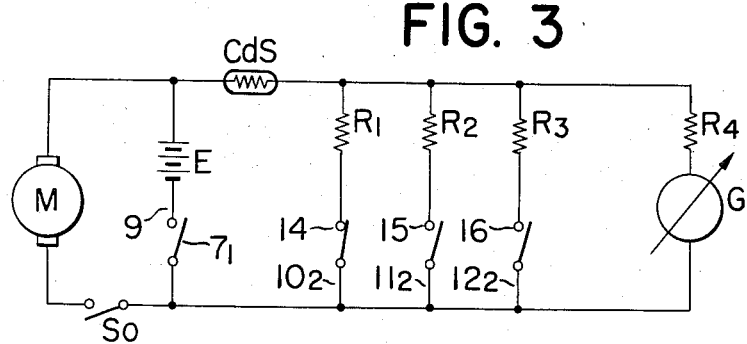
FIG. 3 is a drawing showing an example of an electric circuit applied to the device of FIG. 1.
Figure 4:
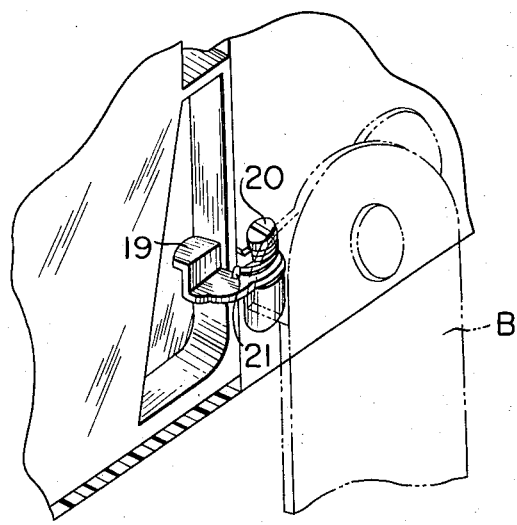
FIG. 4 is a general view of a part of the device shown in FIG. 1.
Figure 5:
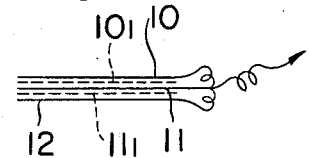
FIG. 5 and FIG. 6 show cross-sectional outline as indicated by line X-X' and Y-Y' respectively of the device of FIG. 1.
Figure 6:
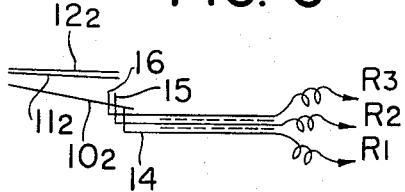

In this case when notches are formed at branch shape free ends $10_2$, $11_2$, $12_2$ of the electrode plates 10, 11, 12 at front side wall $6_2$ of the magazine corresponding to film sensitivity, the opposing free ends drop into the notches by their elasticity. As notches are formed at $11_2$, $12_2$ parts outside of the free end $10_2$ at the magazine 6 shown in FIG. 1, the branch shape free ends $11_2$, $12_2$ drop into the notches thus separated from the opposing electrodes 15, 16. On the other hand, as notches are not provided at the branch shape free end $10_2$, said free end $10_2$ is pushed up to the opposing electrode by the side wall of the magazine thus an electric path is formed with the opposing electrode 14 (FIG. 3 and FIG. 6). Next, as the grip 4 is shifted to use position, the holding piece 19 is made to protrude within the housing chamber 5 by the cam piece 18 against the elastic power of the spring 21 and pushes the front wall $6_2$ of the magazine to forward direction. As a result, the magazine 6 is held at its operating position by the holding piece 19.

Figure 1:
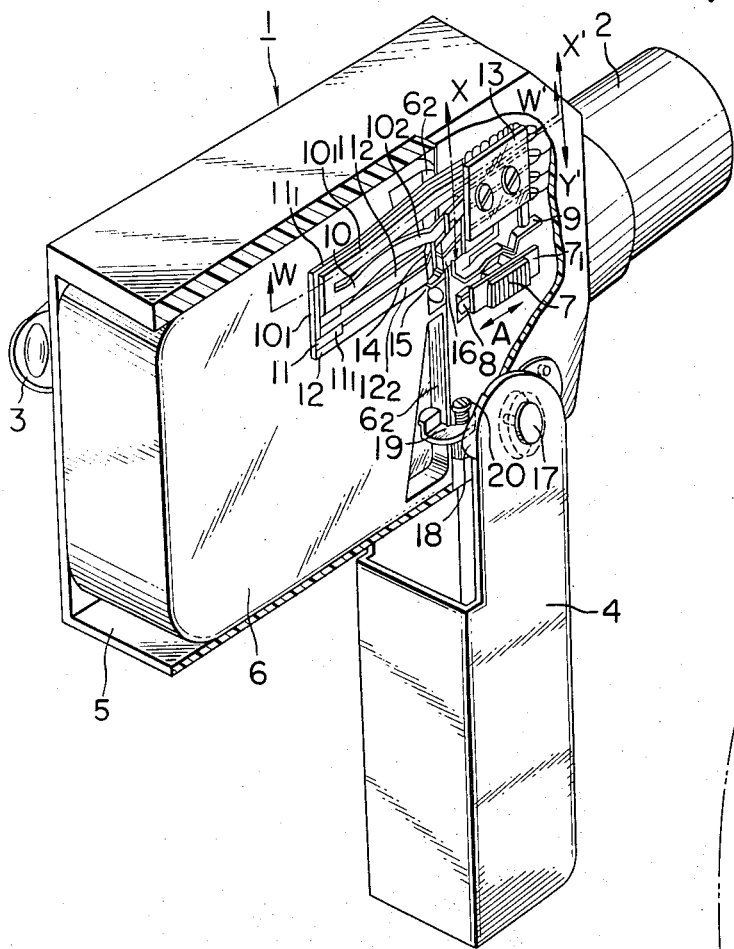
FIG. 1 is an arrangement drawing of an example of a device in which the present invention is applied to a cine-camera.

While the magazine 6 is elastically pressed to its use position in association with the grip 4, when holding member which is associated with the grip is not provided, as the magazine 6 is loaded into the housing chamber 5, the electrode plates have their fixed ends contact with the wall being cut out in FIG. 1, therefore their branch shape free ends $10_2$, $11_2$, $12_2$ push the magazine 6 with their elasticity against the side wall opposing the cut out side wall fixing the same, thus the film sensitivity is automatically set as previously mentioned without closing a back lid by presence or non-presence of the notches. In this case the magazine is surely held at operating position only when the back lid is closed.

Figure 2B:
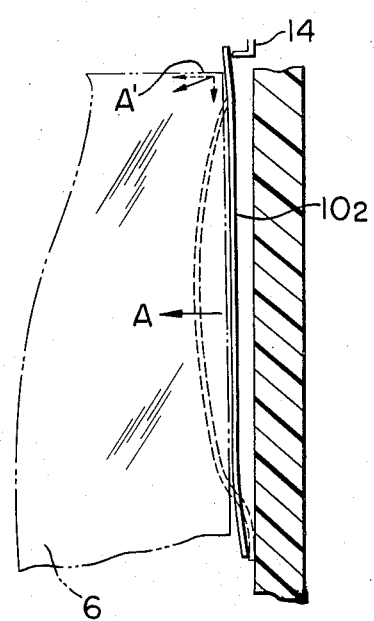
FIG. 2(B) is a principle drawing showing an important part in enlargement of the device in FIG. 1.
Figure 2A:
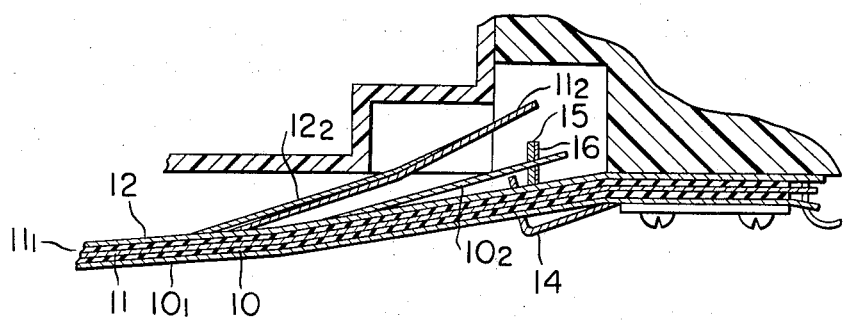
FIG. 2(A) is a cross-sectional view of the important part as shown by line W-W' of the arrangement drawing of FIG. 1.

FIG. 2(B) is to show a state of the branch shape free end $10_2$ only when the magazine 6 is inserted in a schematic manner, wherein the free end $10_2$ engages with the front end wall of the magazine 6 and is connected with the opposing electrode 14. At this time as the free end $10_2$ is pushed up by the side wall of the magazine from the state shown by dotted line before the magazine 6 is inserted, the branch shape free end $10_2$ presses the magazine 6 by its elastic power to a direction of arrow mark A, and holds the magazine 6 in the housing chamber. At the same time, the forward end of the free end $10_2$ being connected with the electrode 14, and being pressed to forward end wall of the magazine, forms the holding force with their resultant force A' and the force A. The other branch shape free end which engages with the notch of the magazine 6 will have by the engagement with the notch the force A' at its engaging part and will have by the pressing of the side wall of the magazine the force A, both of which work as the holding force for magazine.

While in the above examples explanations were made on a cine-camera, the invention can naturally be applied to a still camera in a similar manner.

As has been explained above in the present invention magazine is self-retained for automatic setting of film sensitivity by insertion of the magazine thus film sensitivity is registered and at the same time the structure of electrode is very flat and there is no unnecessary part in a chamber, thus it can be built in a small size camera which has little space in it, which makes it very effective.

FIG. 7 to FIG. 12 are to show other modification example in cine-camera according to the present invention, showing a sample camera wherein an electricity supply switch for a film driving motor for a cine-camera is made integrally with a switch to automatically set the film sensitivity ilustrated in the above mentioned examples, so that reduction of component parts and assembly of the same is made easy. Now it will be explained referring to drawings.

In FIG. 7 to FIG. 10, 101 is a main body of camera, 102 and 102' are film magazines having signal parts 102a, 102a' which correspond to the film sensitivity of the film contained therein, for example, 102 may be a magazine for low sensitivity film and 102' is a magazine for high sensitivity film. 103 is a main switch which can be operated from outside of the camera 101. 104 is an elastic body having electric conductivity being fixed to the main body 101 through an insulating plate 119 by a screw 107, and the body 104 has a ⊐-shaped part and a bent part 104C which engagedly contact with a protruding part 103a provided at the above mentioned main switch. Said bent part 104C works together with the protruding part 103a provided at the main switch 103 and the main switch 103 can be held respectively at a first position shown in FIG. 7 and at a second position shown in FIG. 9. When the main switch 103 is held at said first position, a flexible contact piece 104d positioned at an extension of the above mentioned bent part 104C and a contact 106 are opened, while when the switch 103 is held at the second position the above mentioned flexible contact piece 104d·c and the contact 106 are contacted with proper pressure. The protruding part 103a of the main switch 103 and the bent part 104c of the above mentioned elastic body 104 have their shapes so characterized that the click action of the main switch 103 can be done between said first and second positions.

The ⊐-shaped intermediate part 104b of the above mentioned elastic body 104 is always contacting under pressure with the side wall 101a of the film magazine chamber 101b of the main body 1 of a camera, and is so positioned as not to form obstacles when the magazines 102, 102' are inserted into said magazine chamber 101b. On the other hand, the flexible contact piece 104a provided at an open end of said ⊐-shaped part is always biassed to the direction of the magazine chamber 101b, and composes a contact with opening tendency with contacting part 105a of the contact piece 105 so positioned as can be engagedly contacted with said flexible contact piece 104a.

Figure 10:
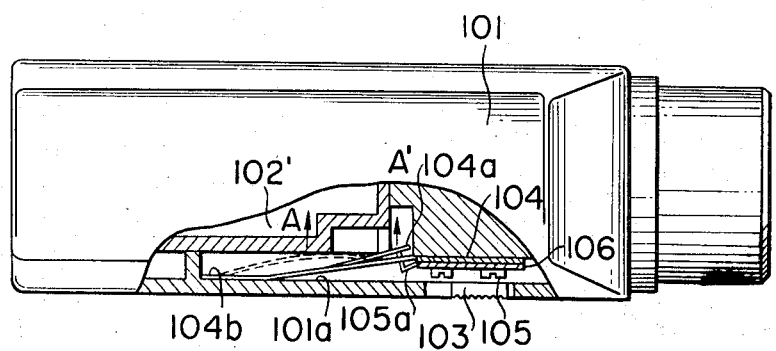
FIG. 10 is a cross-sectional view of an important part of FIG. 9.
Figure 11:
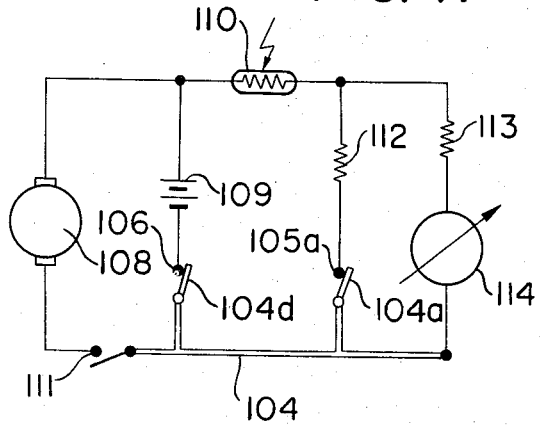
FIG. 11 and FIG. 12 are electrical circuit diagrams, each one of which shows an electrical circuit applied to examples of the present invention.
Figure 12:
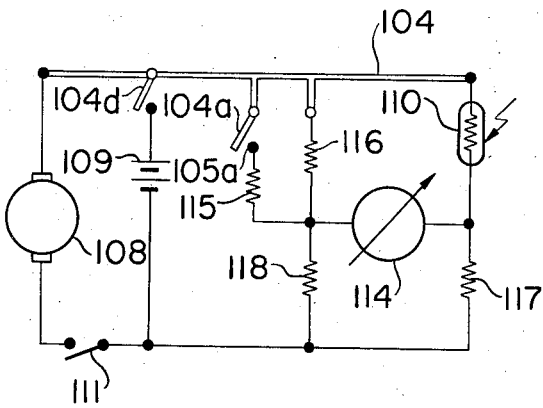

FIG. 11 and FIG. 12 show electric circuit diagrams to which the present invention can be applied, wherein 108 is a driving motor which receives input from a power source 109 through the above mentioned contact 106 and the contact piece 104d of said elastic body 104 having electric conductivity, and further a release contact 111. 110 is a light receiving element, 114 is a meter, 112, 113, 115, 116, 117, 118 are resistances. FIG. 11 shows a case wherein a diaphragm not shown in the drawing is driven by rotating movement of said motor 114 through the current varying depending on the amount of incident light into the light receiving element 110, thus the amount of exposure is controlled. And the arrangement is so made that for example when CdS, etc. is used as the light receiving element and the current flowing through said motor 114 increases, in a case where said diaphragm has a stopping-down tendency, the flexible contact piece 104a provided at an open end of the elastic body 104 and the contact part 105a retain their opened contact state even when low sensitivity film magazine is inserted and when a magazine is inserted as shown in FIG. 7 and FIG. 8, and when high sensitivity film magazine is inserted, by insertion of the magazine as shown by FIG. 9 and FIG. 10 the contact between the flexible contact piece 104a provided at end of the elastic body 104 and the contact part 105a becomes closed state.

By the engagement between the flexible contact piece 104a and the forward end wall of the magazine at a time when the magazine is inserted, the contact piece 104a gives the magazine the above mentioned force A', irrespective of presence of the notches, and this forms the force to retain the magazine within the housing chamber. Further, as in the above mentioned examples if the elastic body 104 is bent to magazine direction in a bow shape as shown in FIG. 7 and FIG. 10, the above mentioned force A' works toward the direction of side wall of the magazine thus the force to retain the magazine can be increased together with the force A'.

Figure 7:
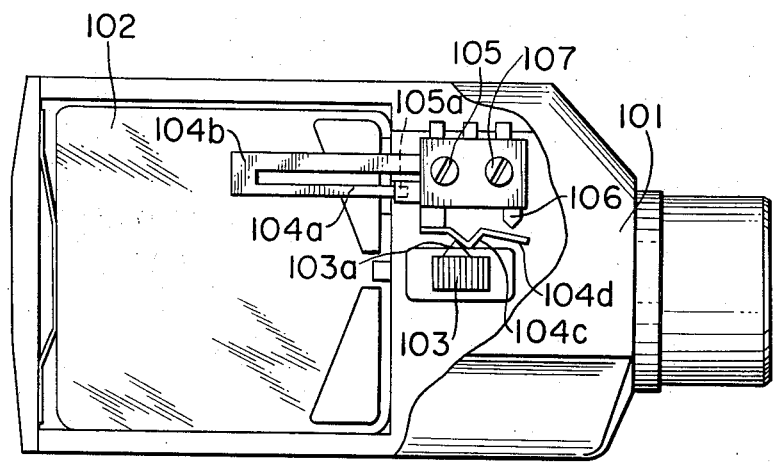
FIG. 7 is to show another example of a camera according to the present invention, indicating a side view of an important part of a camera at a time when a film magazine with a specific sensitivity is inserted and a main switch is off.
Figure 8:
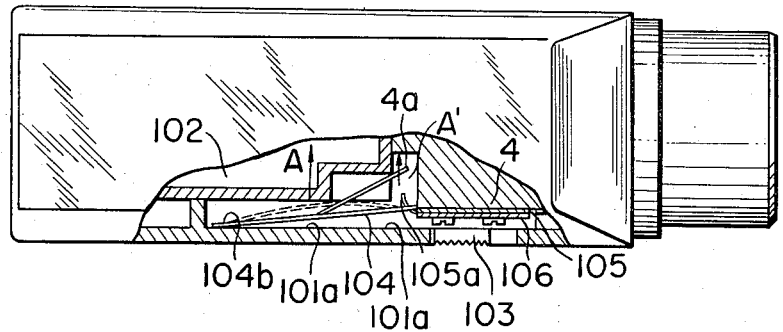
FIG. 8 is a cross-sectional view of an important part of FIG. 7.
Figure 9:
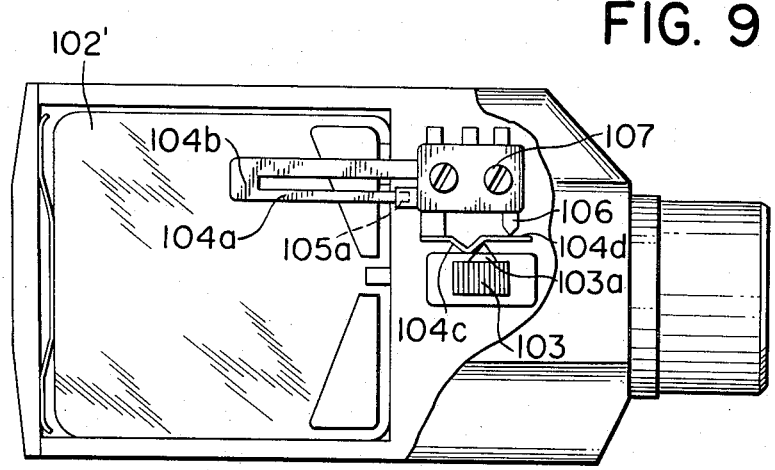

FIG. 12 shows so-called servo system wherein a light receiving element 110 is provided behind the diaphragm driven by the above mentioned motor 114 to control the amount of incident light into said element at always constant level, and even such system is so arranged that when such element is used as reducing resistance value as amount of incident light increases, for example, CdS, etc., as in the case of FIG. 11, if a low sensitivity film magazine is inserted even by insertion of the magazine as shown by FIG. 7 and FIG. 8, the contact between the flexible contact piece 104a provided at an end of the elastic body 104 and the contact part 105a will retain in an opened state, while when a high sensitivity film magazine is inserted, as shown in FIG. 9 and FIG. 10 the contact between the flexible contact piece 104a provided at an end of the elastic body 104 and the contact part 105a becomes closed state.

As has been explained above according to the present invention, such unique film sensitivity setting device can be realized that in a film sensitivity control mechanism for a cine-camera, a contact sensing member for contact with a film magazine having a flexible contact piece which can selectively take either opened position or closed position by a film magazine having at its outside a signal means corresponding to the film sensitivity, and a main switch flexible contact piece of said camera, further a holding member to work jointly with a protruding part provided on said main switch for retaining the main switch, still further wiring member are provided on one electro-conductive elastic body, thereby reduction of components is achieved, thus the assembly of the device becomes easy and its function is reliable, thus a low cost camera can be made and such device will be very convenient.

Figure 18:
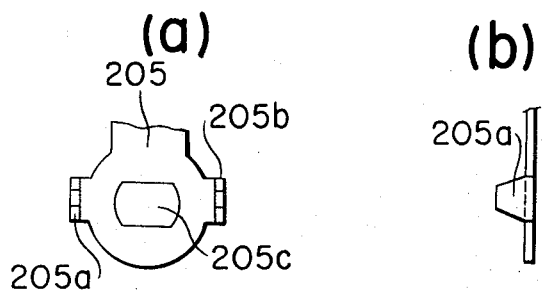
FIG. 18(a), (b) are a front elevation and a side elevation of an important part of a clicking elastic member which can be applied to the structure of the grip shown in FIG. 13 through FIG. 15.

FIG. 13 to FIG. 17 show such cine-camera as having a grip structure which can be applied to the camera shown in FIG. 1 to FIG. 4. In FIG. 13 to FIG. 17, 207 is a grip axle which goes through a camera main body, an elastic member 205 for clicking and a grip 202 in U-shape; and has its both ends fixed with fixing screws 204 and 206, further is axially supported in a freely rotatable manner at a bearing part provided at a main body 101. The above mentioned elastic member 105 has an oblate hole 205c at its axle supporting part as shown in FIG. 18 and is pressure inserted into the oblate shape axle part provided at the rotating axle and is fixed in a non-rotatable manner, further it has tapered projections 205a, 205b which engage engaging grooves 202a, 202b provided on the above mentioned grip 202, being shown in FIG. 16.

Concave parts 201a and 201b, which engage with a protruding part 205d provided at an extended elastic part of the above mentioned elastic member at a first and second stop positions, respectively, of the grip and gives said grip clicking action, are provided at the main body 1. That is, 201a and 201b work as click receptacles. In assembling, after positioning is done by matching the rotating center of the grip 202 with a center of bearing of a main body 201 of a camera, the rotating axle 207, integrally fixed with the elastic member 205, is inserted from left end of FIG. 17 and is tightened by fixing screws 204 and 206.

At this time the above mentioned tapered protruding parts 205a, 205b provided at the elastic member 205 will be engaged without any losening with an engaging groove provided at the grip 202 by fixing screws 4 and 206, in a course of tightening against the elastic power of the elastic member 205. When the above mentioned grip of U-shape is made of light metal alloy, etc., the material itself has flexibility, therefore, it is possible to adjust the tightening force of the above mentioned fixing screws 204 and 206 thereby the force working between said elastic member 5 and the main body 1 can be adjusted, thus it is very convenient.

Figure 13:
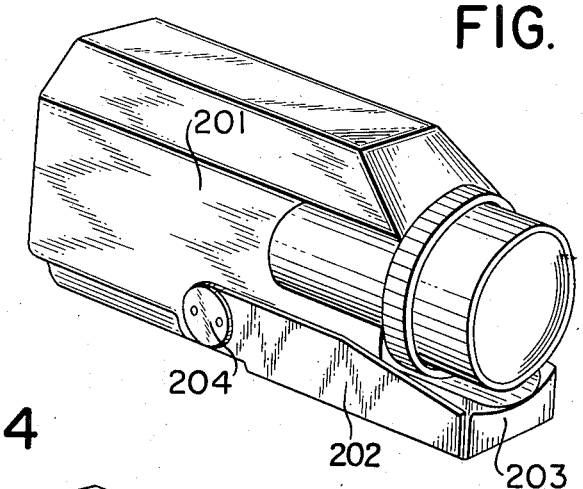
FIG. 13 and FIG. 14 are oblique views showing a state in which an embodiment pattern of a grip structure applied to a camera of the present invention is applied to a cine-camera and said grip is folded down and a state wherein said grip is click-stopped in a ready-to-photograph state, respectively.
Figure 14:
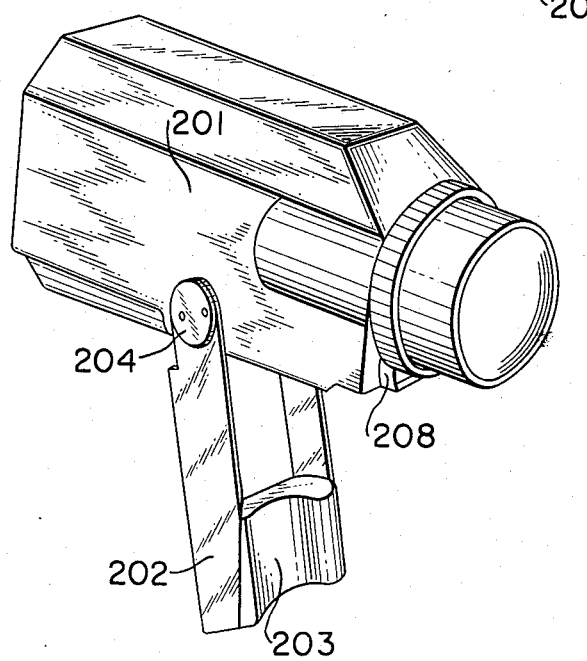
Figure 15:
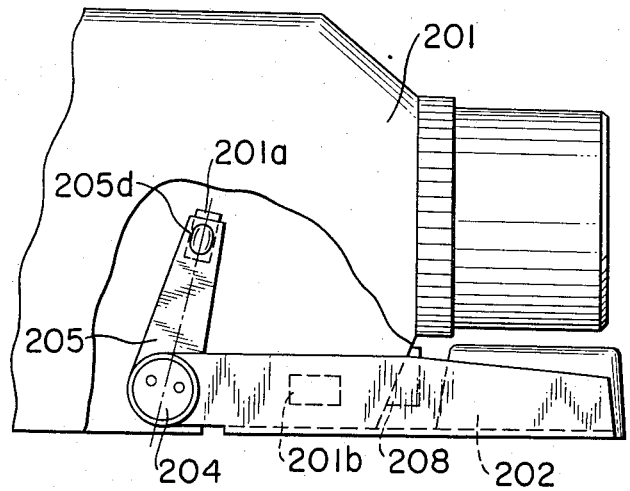
FIG. 15 is a side view of an important part of a camera having a grip according to the present invention.
Figure 16:
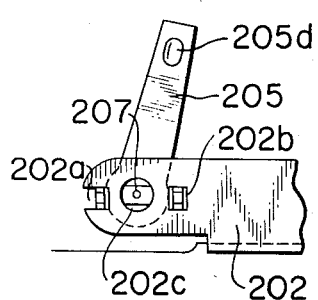
FIG. 16 is a side view showing a connection relationship between a clicking elastic member which can be applied to the grip device shown in FIG. 13 through FIG. 15 and the grip.
Figure 17:
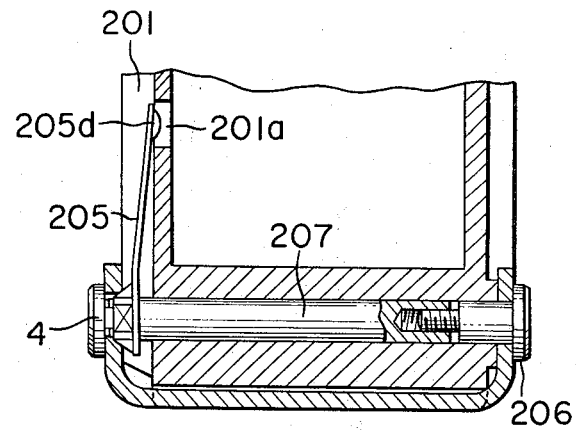
FIG. 17 is a cross-sectional view of an important part in a state being cross-sectioned at a center of grip axle.

Further, a grip pad 3 of such shape as shown in FIG. 13 and FIG. 14 is provided at forward end of the above mentioned grip 2 thereby the release button 8 provided at a front face of a camera can be so blocked as making it non-operative in a state where the grip is folded down by the U-shape of the grip and the grip pad so that an inadvertent exposure against the will of a photographer can be prevented.

As has been explained above, the present invention provides sure and accurate clicking action by a very simple make-up and assembly and adjustment are easy, further the device can be made with low cost, thus the invention is very useful in practical application.

While several kinds of grips for cameras having click stops have heretofore proposed, every one of them has such various disadvantages that the elastic force working between the grip, rotating axle for grip and the main body supporting said grip, and the click spring provided between the main body and the grip must be made large for providing sufficient stability at a time of click stop, therefore in order to assure strength of each part mentioned the structure of the device apt to become complicated and big, on the otherhand, if it is intended to reduce said elastic force working between the above mentioned parts to make the structure smaller, the losening generated at a time of click-stop becomes large. Thus it has been very difficult to provide such structure as mentioned above especially in a small size camera with a stability. Contrary to above, in the present invention by making such distance large as between the point of click stopping action of a click stopping elastic member provided between a grip and a main body supporting the grip, and a rotating axis of said grip, it is possible to make the amount of deflection and working force by elastic deformation large, therefore it becomes possible to make, at the same time, both the torque by rotation operating of the above mentioned grip between the above mentioned first click stop position and the second click stop position, and the torque by rotation start operating when the rotation of grip is started from said first and second positions.

It is also possible to completely eliminate such losening at a time of operation as seen in conventional devices, by providing a tapered projection, to engage with an engaging groove provided at the grip, on the above mentioned elastic piece which is retained at the above mentioned rotation axle in such manner as cannot be rotatable to each other so that said tapered projection engages with said engaging groove without allowing losening after being assembled, thus a grip with very high dependability and stability can be made. Also by providing said rotation axle of grip at about central lower position of a camera, the grip is so made that it blocks a release button provided at front part of the camera when the grip is folded down when photographing is not being done, thus the invention is quite convenient.

As has been explained above in the present invention, such signal as formed on the side wall of the film magazine to indicate exposure element such as film sensitivity, etc. is detected by a branch shape elastic contacting piece and at the same time the film magazine is pressed against the side wall of the magazine housing chamber by elasticity of the contacting piece, thereby the magazine is retained within the film housing chamber, thus setting of exposure element is automatically done by loading of the magazine into the housing chamber. Further it is possible to hold the magazine firmly within the magazine housing chamber in association with the grip of camera, thus the present invention has very good practical operating characteristics.

While the above explanations have been made only on the sensitivity of film contained within the magazine as an exposure element on the magazine, such device as covering signals to indicate type of film or shutter speed employed, etc. naturally fall under the scope of the present invention as one of modification example of the same without any contradiction or deviation.

What is claimed is:

1. A photographic camera using a film magazine having a notch on one surface thereof for indicating characteristics of the film, which comprises a camera housing having first and second walls facing each other and defining a magazine loading chamber therebetween, the magazine being loadable longitudinally into the chamber with the notched surface thereof extending opposite the first wall of the chamber; and notch detecting means including a first resilient elongated electrode having a portion thereof affixed to the housing, and a second electrode affixed to the housing and disposed adjacent the first electrode in selective engagement therewith, the first electrode being biased transversely into the chamber toward the second wall, whereby when the magazine is loaded into the chamber in operating position, the biased portion of the first electrode is selectably engageable with the notch in the magazine to effect the selective engagement of the first and second electrodes while the transverse biasing force of the first electrode against the notched surface of the magazine presses the magazine against the second wall of the chamber to retain the magazine in operating position.

2. The camera according to claim 1, in which the first electrode is defined by a conductive channel member having first and second legs, the first leg being affixed to the housing and the second leg having a portion extending transversely into the chamber and a free end terminating adjacent the second electrode.

3. The camera according to claim 1, in which the biased portion of the first electrode extends generally longitudinally in the chamber with a section thereof bowed toward the second wall for engaging the notched surface of the magazine to urge the magazine against the second wall.

4. The camera according to claim 1, which is characterized by the above mentioned notch detecting means further has:
   a. an exposure meter,
   b. a photo-conductive cell to receive the light from an object,
   c. a direct current power source which is connected in series with the meter and the cell and forms an exposure meter circuit, and
   d. at least one correction resistance which is connected in series with a switch member formed by the above mentioned first and second electrodes within the above mentioned exposure meter circuit.

5. The camera according to claim 4 which is characterized by that the above mentioned first electrode is connected with a minus terminal end of power source.

6. A photographic camera using a film magazine which has at least one notch on one surface thereof to indicate characteristics of the film, which comprises a camera housing having first and second walls facing each other and defining a magazine loading chamber therebetween, the magazine being loadable longitudinally into the chamber with the notched surface thereof extending opposite the first wall of the chamber; and notch detecting means including first and second mutually insulated, resilient elongated electrodes having corresponding portions affixed to the housing, and third and fourth electrodes affixed to the housing and individually disposed adjacent the first and second electrodes in selective engagement therewith, each of the first and second electrodes being biased transversely into the chamber toward the second wall, whereby when the magazine is loaded into the chamber in operating position, the biased portions of the first and second electrodes are selectably engageable with the notches in the magazine to effect the selective engagement of the first and third electrodes or of the second and fourth electrodes, while the cumulative transverse biasing forces of the first and second electrodes against the notched surface of the magazine presses the magazine against the second wall of the chamber to retain the magazine in operating position.

7. The camera according to claim 6, which is characterized by that the above mentioned notch detecting means further has:
   a. an exposure meter,
   b. a photoconductive cell to receive the light from an object,
   c. a direct current power source which is connected in series with the meter and the cell and forms an exposure meter circuit, and
   d. first and second correction resistances which are individually connected in series with switch members being formed by the above mentioned first and third electrodes and second and fourth electrodes, respectively, within the above mentioned exposure meter circuit.

8. The camera according to claim 6, in which each of the first and second electrodes is defined by a conductive channel member having first and second legs, the first leg of each channel member being affixed to the housing and the second legs of the channel members having portions extending into the chamber and respective free ends terminating adjacent the third and fourth electrodes.

9. The camera according to claim 6, in which the biased portions of the first and second electrodes extend generally longitudinally in the chamber with a section thereof bowed toward the second wall for engaging the notched surface of the magainze to urge the magazine against the second wall.

10. A photographic camera using a film magazine having a notch on one surface thereof for indicating characteristics of the film which comprises, in combination, a camera housing having first and second walls facing each other and defining a magazine loading chamber therebetween, the magazine being loadable into the chamber with the notched surface thereof extending opposite the first wall of the chamber; notch detecting means including a first resilient elongated electrode having a first portion thereof affixed to the housing, and a second electrode affixed to the housing and disposed adjacent the first electrode for selective engagement therewith, the first electrode being biased transversely into the chamber toward the second wall, whereby when the magazine is loaded into the chamber in operating position, the biased portion of the first electrode is selectively engageable with the notch in the magazine to effect the selective engagement of the first and second electrodes while the transverse biasing force of the first electrode against the notched surface of the magazine presses the magazine against the second wall of the chamber to retain the magazine in operating position; and exposure meter circuit means including a direct current power source, a photoconductive cell to receive the light from an object, a meter circuit including an exposure meter serially connected with the direct current power source and the cell, and power switch means interconnecting the first electrode with the meter circuit, the switch means comprising a first terminal engageable with the first electrode, a second terminal engageable with the meter circut, and an external operating member for selectively interconnecting the first and second terminals.

11. The camera according to claim 6, in which the biased portions of the first and second electrodes extend substantially parallel to each other.

* * * * *

UNITED STATES PATENT OFFICE
CERTIFICATE OF CORRECTION

Patent No. 3,810,200                         Dated May 7, 1974

Inventor(s) Keiichi Sakaguchi et al

It is certified that error appears in the above-identified patent and that said Letters Patent are hereby corrected as shown below:

IN THE HEADING OF THE PATENT:

Insert:

--[30]     Foreign Application Priority Data

November 18, 1971   Japan..............46-108301
    November 19, 1971   Japan..............46-108330
    December 20, 1971   Japan..............46-103482--.

The name of the assignee should read:

--Canon Kabushiki Kaisha--.

Signed and sealed this 17th day of September 1974.

(SEAL)
Attest:

McCOY M. GIBSON JR.                    C. MARSHALL DANN
Attesting Officer                      Commissioner of Patents